United States Patent
Röhm

(10) Patent No.: US 6,554,292 B1
(45) Date of Patent: Apr. 29, 2003

(54) DRILL CHUCK FOR SMOOTH- AND HEX-SHANK BITS

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 10/010,326

(22) Filed: Nov. 8, 2001

(30) Foreign Application Priority Data

Jun. 20, 2001 (DE) ...................................... 201 10 179 U

(51) Int. Cl.⁷ ........................ B23B 31/107; B23B 31/12; B23B 31/22
(52) U.S. Cl. ........................ 279/137; 279/30; 279/75; 279/155; 279/140
(58) Field of Search .............................. 279/22, 29, 30, 279/71, 72, 74, 75, 76, 81, 82, 60–65, 902, 904–906, 143–145, 14, 66, 158, 140; 408/239 R, 239 A, 240; 403/377, DIG. 6; 81/438; 433/128

(56) References Cited

U.S. PATENT DOCUMENTS

| | | | | |
|---|---|---|---|---|
| 2,405,772 A | * | 8/1946 | Adams et al. | 279/22 |
| 3,398,965 A | * | 8/1968 | Cox | 279/30 |
| 6,135,462 A | * | 10/2000 | Robison | 279/137 |
| 6,193,242 B1 | * | 2/2001 | Robison | 279/137 |
| 2002/0063401 A1 | * | 5/2002 | Huggins et al. | 279/137 |
| 2002/0109306 A1 | * | 8/2002 | Huggins et al. | 279/137 |

* cited by examiner

Primary Examiner—Steven C. Bishop
(74) Attorney, Agent, or Firm—Herbert Dubno; Andrew Wilford

(57) ABSTRACT

A drill chuck has a body formed with an axially forwardly open tool recess and holding a plurality of tool-gripping jaws. A socket formed with an axially forwardly open polygonal-section seat is nonrotatable in a seat of the chuck body and axially displaceable in the chuck body into and out of a tool-releasing position. A latch is radially displaceable in the socket in the tool-releasing position of the socket between an inner retaining position projecting radially into the seat and an outer freeing position clear of the seat and projecting radially into the pocket. The latch is aligned radially with the pocket only in the tool-releasing position. The chuck body engages the latch and forces it into the inner retaining position.

14 Claims, 6 Drawing Sheets

DRILL CHUCK FOR SMOOTH- AND HEX-SHANK BITS

FIELD OF THE INVENTION

The present invention relates to a chuck. More particularly this invention concerns a drill chuck.

BACKGROUND OF THE INVENTION

A standard chuck has a body centered on and rotatable about a chuck axis and formed with an axially forwardly open tool recess. A plurality of angled guide passages open into the recess. Respective jaws are displaceable in the guide passages into and out of an advanced positions projecting into the seat. Mechanism on the chuck displaces the jaws into their advanced positions for gripping a smooth-shank bit in the recess. The jaws are angularly equispaced and moved radially synchronously, typically by engagement of teeth on the backs of the jaws with an internally threaded ring, so that the tool is gripped centered on the axis.

Nowadays it is increasingly common to provide drill bits of all sizes and uses with hexagonal-section shanks that are identical, so that they can be used in a standardized hexagonal-socket of a power tool. Such bit can in fact be solidly gripped by the standard three-jaw chuck, in which case they have little advantage over smooth-shank tools. Preferably, such a hex-shank tool is used in a standardized socket on a special-duty power unit, for instance in a screw gun or the like so that the tool can be quickly chucked and dechucked, without the necessity of tightening and loosening holding jaws.

Alternately an adapter can be fitted to an existing jaw-type chuck to allow quick chucking and dechucking of hex-shank tools. This system requires an extra part and adds considerably to the overall length of the power tool.

OBJECTS OF THE INVENTION

It is therefore an object of the present invention to provide an improved drill chuck.

Another object is the provision of such an improved drill chuck which overcomes the above-given disadvantages, that is which can be used with both hex- and smooth-shank tool bits.

A further object is to provide such an improved dual-duty drill chuck which is no larger in length or diameter than the known three-jaw chucks.

SUMMARY OF THE INVENTION

A drill chuck has according to the invention a chuck body centered on and rotatable about a chuck axis and formed with an axially forwardly open tool recess, a plurality of angled guide passages open into the recess, and a pocket open radially inward into the recess. Respective jaws are displaceable in the respective guide passages into and out of an advanced positions projecting into the seat and mechanism on the chuck can displace the jaws into their advanced positions for gripping a smooth-shank bit in the recess. A socket formed centered on the axis with an axially forwardly open polygonal-section seat is nonrotatable in the seat of the chuck body and axially displaceable in the chuck body into and out of a tool-releasing position. A latch is radially displaceable in the socket in the tool-releasing position of the socket between an inner retaining position projecting radially into the seat and an outer freeing position clear of the seat and projecting radially into the pocket. The latch is aligned radially with the pocket only in the tool-releasing position. The chuck body engages the latch and forces it into the inner retaining position except when the socket is in the tool-releasing position so that a polygonal-section shank of a tool formed with a radially outwardly open cutout can be fitted to the seat when the socket is in the tool-releasing position and is retained by engagement of the latch element in the cutout when the socket is not in the tool-releasing position. A lock member is radially displaceable in the chuck body between a locked position engaging the socket and preventing movement of the socket into the tool-releasing position and an unlocked position allowing movement of the socket into the releasing position.

Thus with this chuck a standard cylindrical- or smooth-shank bit can be chucked and dechucked in the standard manner by using the clamping jaws. A hex-shank bit is, instead, fitted to the seat of the socket which is them moved out of the tool-releasing position and locked to hold the bit in place. The chuck can have the same overall dimensions as a standard jaw-type chuck, but can serve perfectly for both types of bits. With the hex-shank bits it has the advantage of fast loading and unloading by simple actuation of the lock member.

According to the invention the latch is a ball and the socket is formed with a radially extending passage receiving the ball and open radially inward and outward. The passage is axially level with the pocket only in the tool-releasing position. The pocket can be formed as a radially inwardly open groove in an inner surface of the recess. The socket and chuck body are formed with axially interengaged polygonal formations inhibiting rotation of the socket in the chuck body. The formation of the socket is an axially rearwardly projecting polygonal-section extension. A spring braced between the socket and the chuck body urges the socket axially forward out of the tool-releasing position.

The chuck body in accordance with a feature of the invention is formed with a passage extending in a plane perpendicular to the axis and open radially inward into the recess and radially outward. The lock member is a pin displaceable along the passage and having an outer end projecting from the chuck body at least in the locked position. A spring braced between the chuck body and the pin urges the pin into the locked position. In one arrangement the socket has an axially forwardly projecting ridge and the pin has an axially rearwardly open groove aligned with the ridge only in the unlocked position of the pin. In this case the pin has a surface engageable with the socket and preventing same from moving into the tool-releasing position except in the unlocked position of the pin. The unlocked position is radially inward of the unlocked position. In another arrangement the socket is formed with a radially outwardly open groove and the pin is formed with a radially inwardly open cutout through which the socket extends with play only in the outer unlocked position. The cutout is offset at least partially from the groove in the locked position with the pin engaged in the groove so as to lock the socket against axial displacement into the tool-releasing position.

The guide passages in accordance with the invention are angularly spaced about the axis and open axially forward into the seat. The jaws have outer edges formed with teeth. The mechanism includes an internally threaded ring axially fixed but rotatable on the body and meshing with the teeth of the jaws. The mechanism also includes a sleeve surrounding the body and fixed to the ring. The lock member projects radially outward through the sleeve.

BRIEF DESCRIPTION OF THE DRAWING

The above and other objects, features, and advantages will become more readily apparent from the following description, preference being made to the accompanying drawing in which.

SPECIFIC DESCRIPTION

Figure 1:
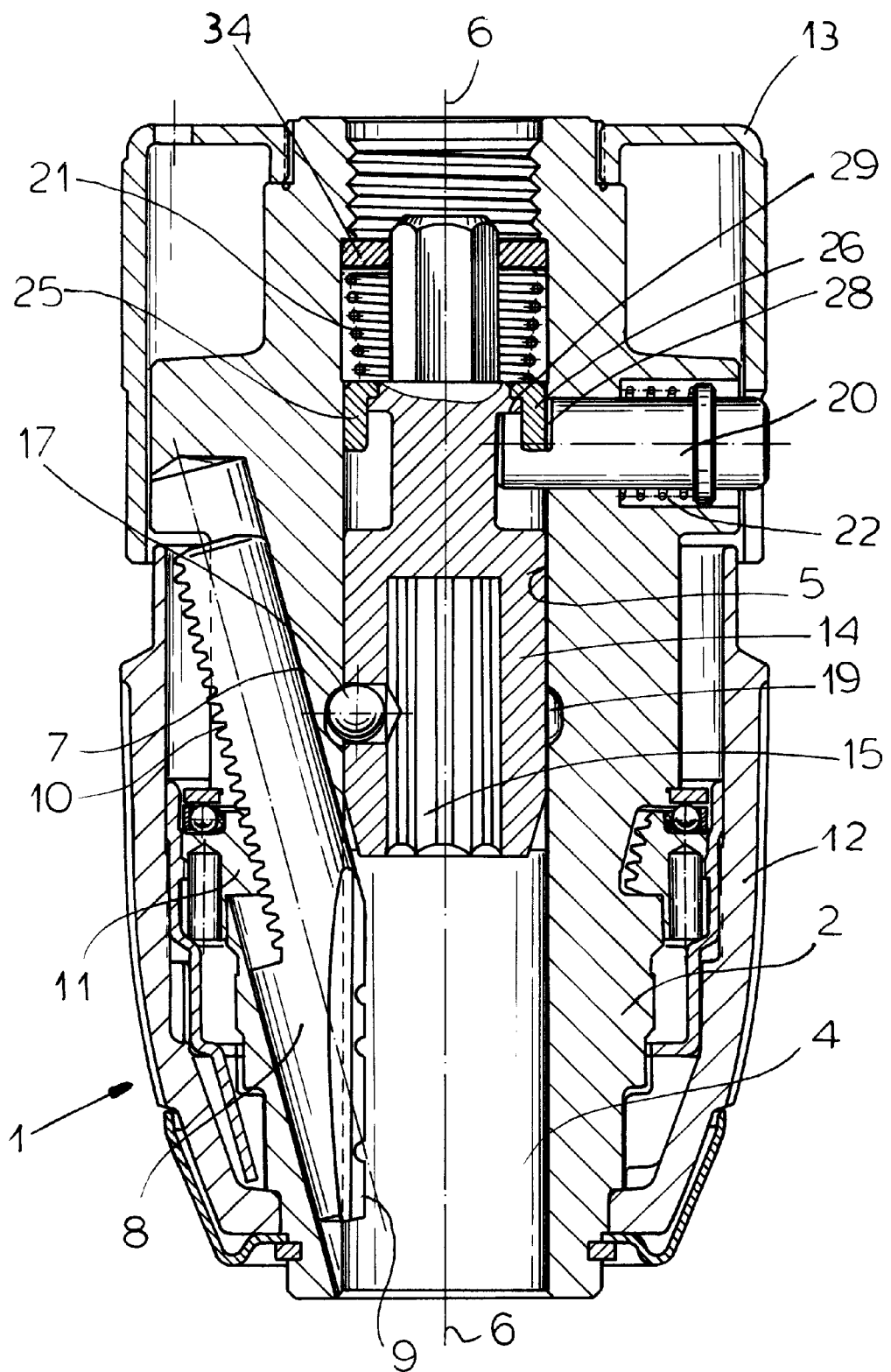
FIG. 1 is an axial section through the chuck according to the invention in a tool-releasing position of a socket member of the chuck.

As seen in FIGS. 1 through 4 a drill chuck 1 has a steel chuck body 2 centered on an axis 6 and formed with a rearwardly open spindle-receiving bore 3, a forwardly open tool-receiving seat 4, and an intermediate bore 5 interconnecting the seat 4 and bore 3 and actually form a rearward continuation of the seat 4. Three angularly equispaced guide passages 7 are angularly equispaced about the axis 6 and open radially forward into the seat 4. Each passage 7 holds a respective jaw 8 having an inner edge 9 adapted to engage a shank of an unillustrated smooth- or cylindrical-shank tool bit and an outer edge formed with a row of teeth 10. An internally threaded tightening ring 11 that is axially nondisplaceable on the body 2 meshes with the teeth 10 and is fixed to a tightening sleeve 12 extending from about the middle to the front end of the body 2. A rear holding sleeve 13 of the same diameter as the sleeve 12 is fixed to the chuck body 2 and extends rearward from the center thereof.

Thus to tighten the chuck on a tool in the seat 3 the user rotates the sleeve 12 in a direction to advance the jaws 8 axially forward (down in FIGS. 1 and 2) and radially inward, if necessary holding the rear sleeve 13 to prevent the body 2 from rotating. To release the tool, the sleeve 12 is rotated in the reverse direction. This is all generally standard.

According to the invention the body 2 holds immediately rearward of the front ends of the jaws 8 an axially displaceable socket 14 formed centered on the axis 6 with a forwardly open hexagonal-section seat 15 adapted to hold a standardized hex shank 18 of a tool 23. A polygonal-section rearward extension 33 of the socket 14 fits in a complementary inner hole of a member 34 fixed in the body 2 to prevent this socket 14 from rotating in the body 2 while permitting it to move axially therein. A spring 21 urges the socket 14 axially forward into the tool-releasing position of FIG. 1.

A latch ball 17 is held in a radially throughgoing passage 30 in the socket 14 and the body 2 is formed with a radially inwardly open pocket or groove 19 aligned with the passage 30 only in the FIG. 1 tool-releasing position of the socket 14. In this tool-releasing position the tool 23 can be inserted into and withdrawn from the seat 15 because the latch ball 17 does not have to project radially inward into the seat 15. When not in this position, the inner wall of the body 2 presses the ball 17 inward so that it has to project into the seat 15, fitting to a radially outwardly open groove 24 formed in the tool 23 so as to retain this tool 23 axially in place in the socket 14.

A lock member or pin 20 is radially displaceable in a radially extending passage 27 of the chuck body 2 and is formed with an axially rearwardly open groove 28 alignable in an inner locked position (FIG. 1) with a forwardly directed ridge or edge 26 of a collar 25 fixed to the socket 14. A spring 22 urges the locking pin 20 radially outward into an outer locked position (FIG. 2) in which the collar ridge 26 engages a surface 29 of the pin 20 and the outer end of the pin 20 projects markedly from the sleeve 13. In the unlocked FIG. 1 position the ball 17 can move into the pocket 19 to release the tool 23, but in the locked FIG. 2 position the ball 17 engages in the tool groove 24 and holds the tool 23 in place.

Thus when used with a standard smooth- or cylindrical-shank tool, the tool shank is inserted in the seat 4 and the sleeve 12 is turned to bring the jaws 8 into radial engagement with it, clamping it in place. The socket 14 serves no function, although a tool shank of sufficiently small diameter can engage without effect back into its seat 15. To dechuck the smooth-shank tool, the sleeve 12 is reverse rotated to back off the jaws 8 and the unillustrated tool is pulled out of the recess 4.

Figure 2:
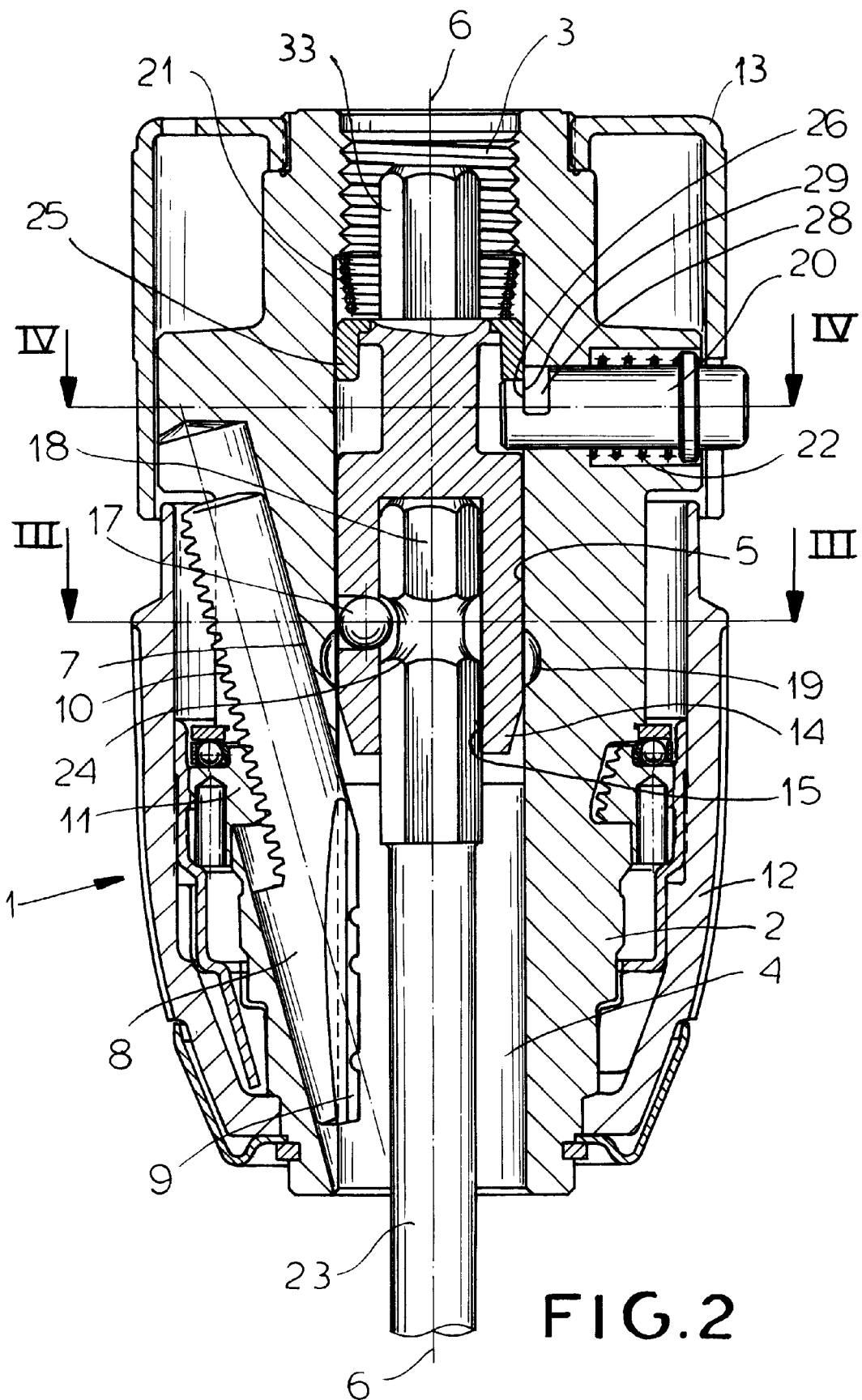
FIG. 2 is a view like FIG. 1 but with the socket member in a tool-holding position.
Figure 3:
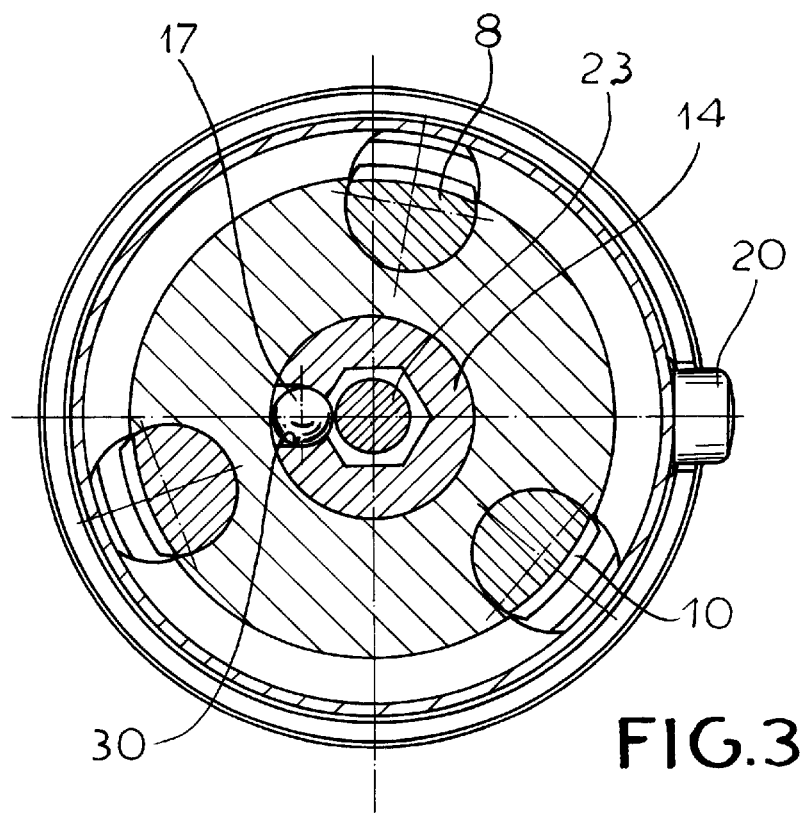
FIGS. 3 and 4 are sections taken along respective lines III—III and IV—IV of FIG. 2.
Figure 4:
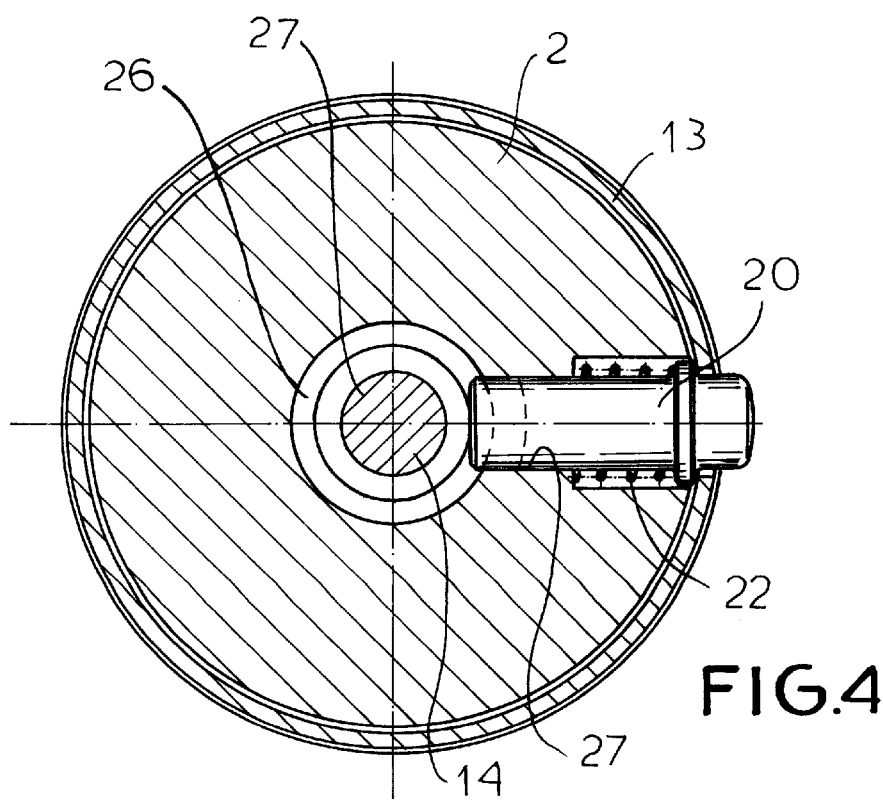
Figure 5:
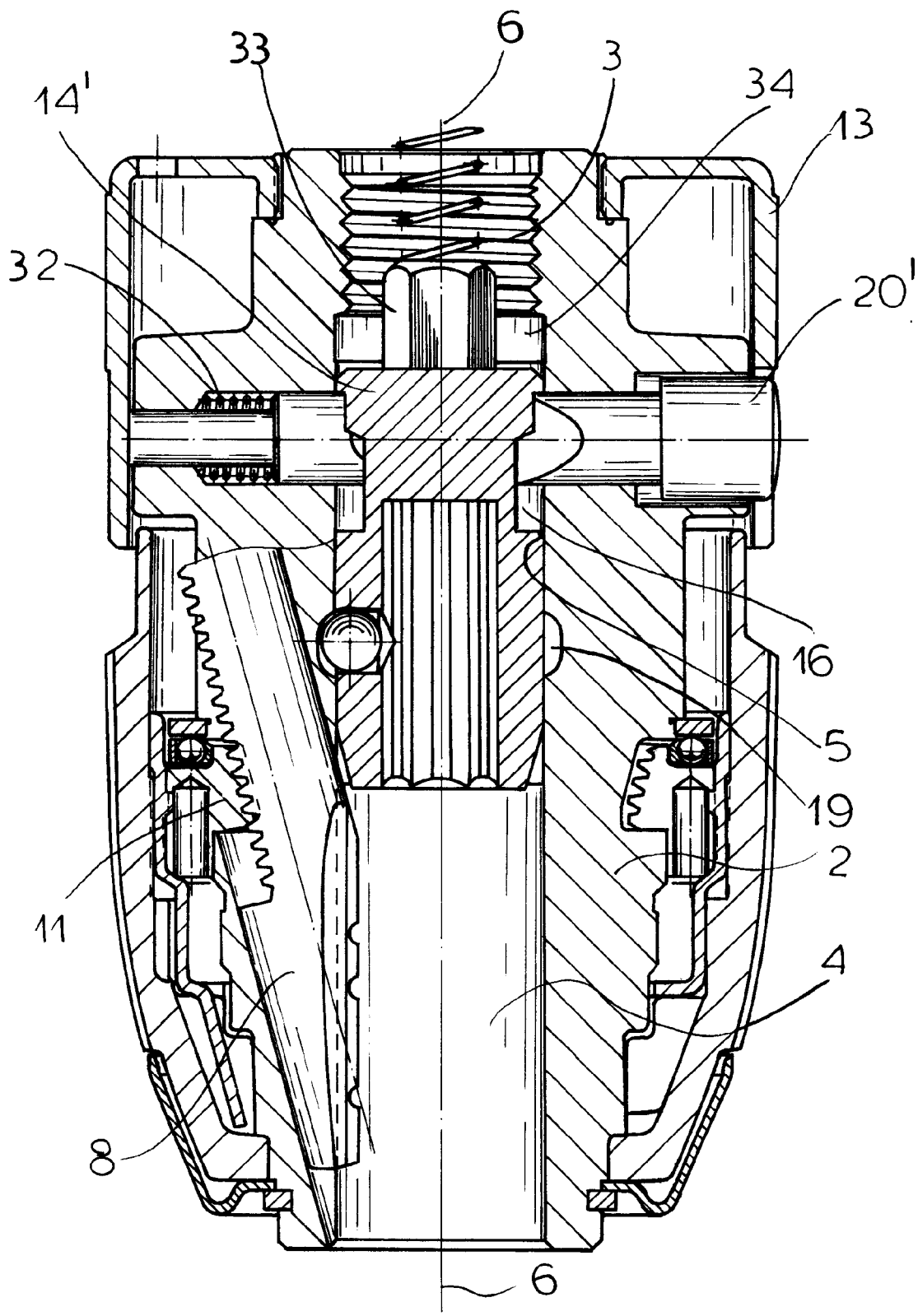
FIGS. 5 and 6 are views like FIGS. 1 and 2 of an alternative chuck in accordance with the invention.
Figure 6:
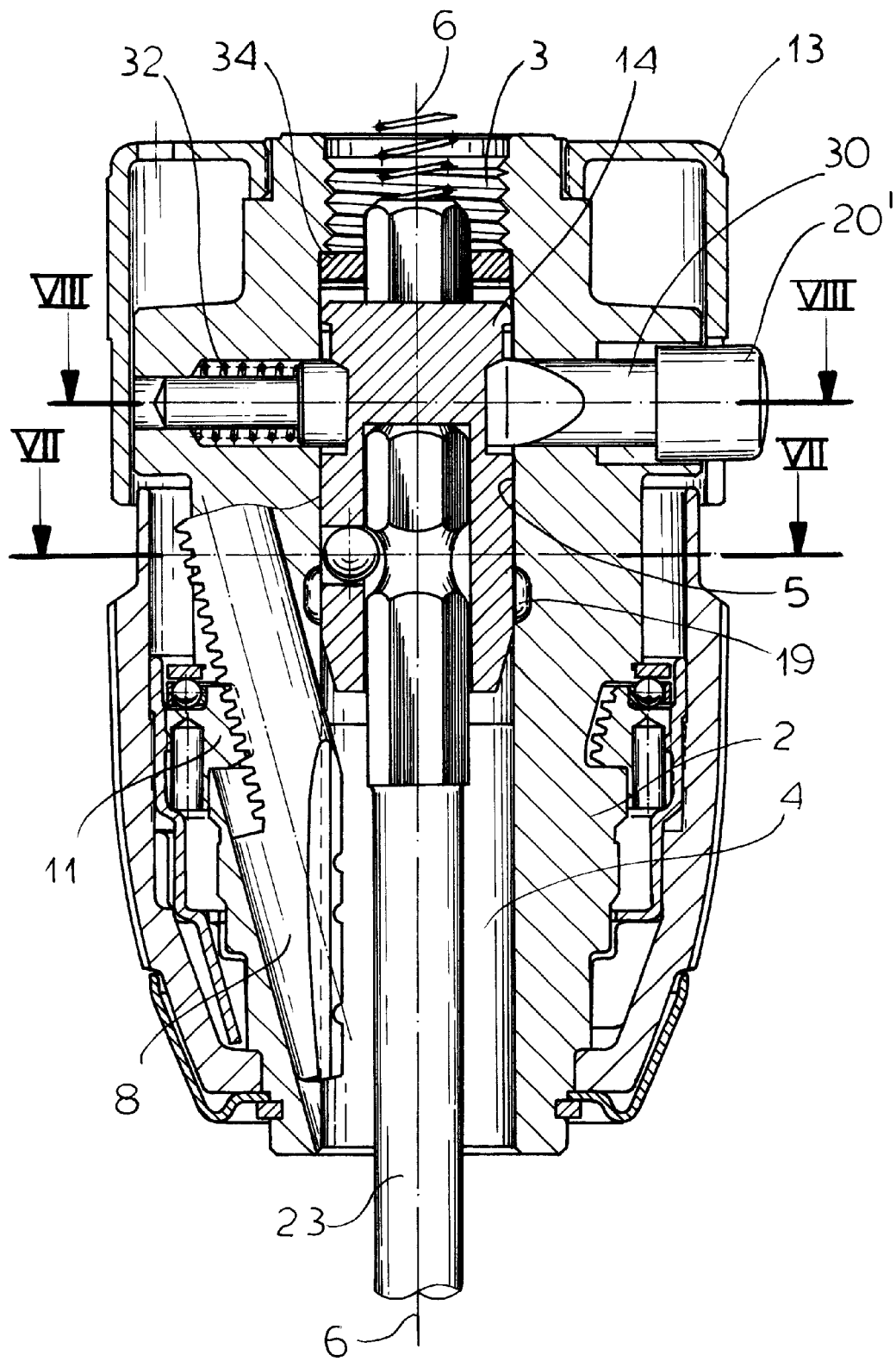
Figure 7:
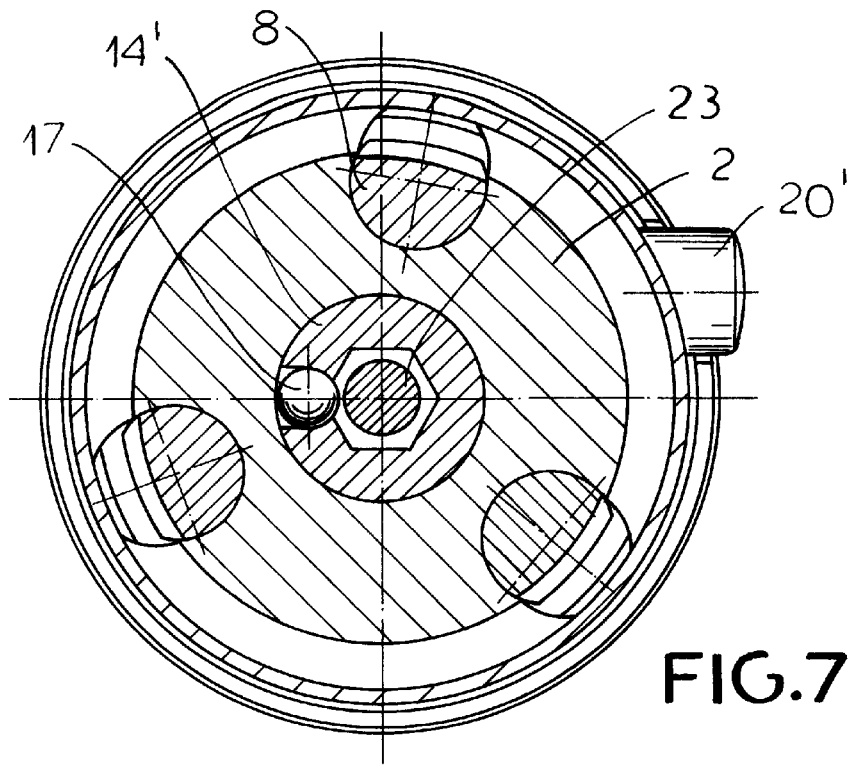
FIGS. 7 and 8 are sections taken along lines VII—VII and VIII—III of FIG. 6.
Figure 8:
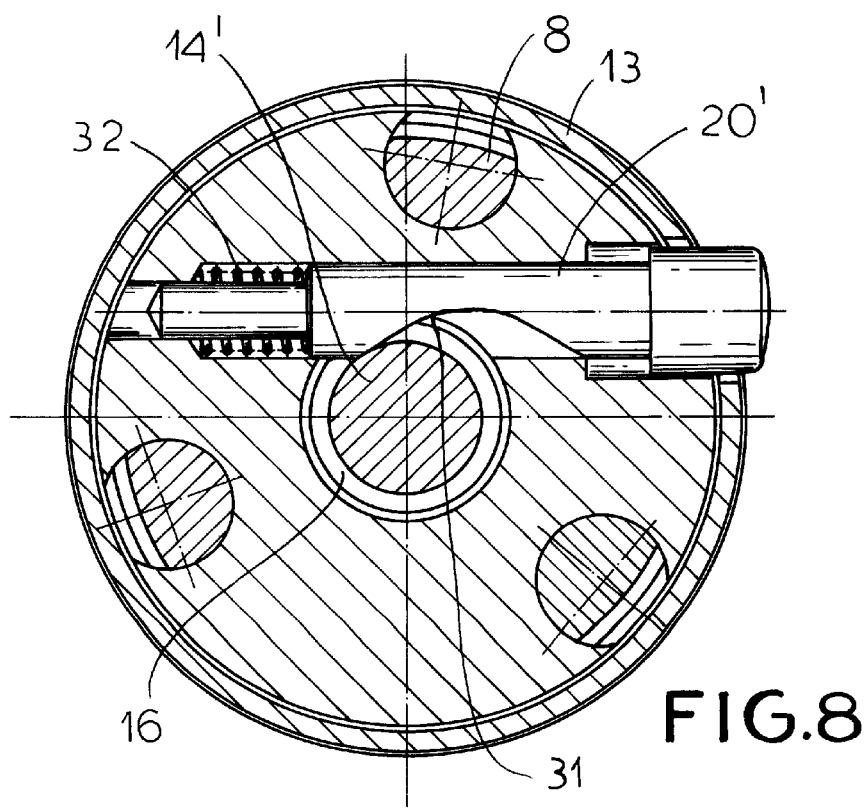

When a hex-shank bit 23 is to be chucked, the outer end of the pin 20 is pushed inward so that the edge 26 of the collar 25 can engage into the groove 28 and the spring 21 will therefore push the socket 14 forward until its passage 30 aligns with the pocket/groove 19. Then the pin 20 is released so that the inner flank of its groove 28 will catch on the collar 25, leaving the parts in the FIG. 1 tool-releasing position. The shank 18 of the tool 23 is then fitted to the seat 15 until its groove 24 aligns with the passage 30. Further rearward movement of the tool 23 pushes the socket 14 back against the force of its spring 21 until the collar 25 is clear of the groove 28, whereupon the pin 20 will snap out into its locked position as shown in FIG. 2. In this position the ball latch 17 cannot move radially outward and the tool 23 is captured in the socket 17, which itself is locked in its rear tool-retaining position by the edge 29 of the lock pin 20.

To release the tool 23, the pin 20 is pushed in to free the socket 14 and the tool 23 is pulled axially forward, aided by the force of spring 21. This action shifts the socket 14 forward until the ball 17 is aligned with the pocket 19, whereupon it moves radially outward to free the tool 23 and allow it to pull out of the seat 15 and out of the chuck 1.

The system of FIGS. 5 through 8 functions identically to that of FIGS. 1 through 4, but has a pin 20' that extends secantally or tangentially past the socket 14' which in this case is formed with a radially open groove 16. The pin 20' itself is formed with a radially inwardly open cutout 31 that in an in inner unlocked position (FIG. 5) of the pin 20' fits around the socket 14' and allows it to move axially. In an outer locked position (FIG. 8) into which the pin 20' is urged by a spring 32, the cutout 31 is offset and the pin 20' engages in the groove 16 to lock the socket 14' in place and prevent it from moving axially forward into the FIG. 5 tool-releasing position.

I claim:

1. A drill chuck comprising:
   a chuck body centered on and rotatable about a chuck axis and formed with an axially forwardly open tool recess, a plurality of angled guide passages open into the recess, and a pocket open radially inward into the recess;
   respective jaws displaceable in the guide passages into and out of advanced positions projecting into the recess;
   a mechanism on the chuck for displacing the jaws into their advanced positions for gripping a smooth-shank bit in the recess;
   a socket formed centered on the axis with an axially forwardly open polygonal-section seat, nonrotatable in the recess of the chuck body, and axially displaceable in the chuck body into and out of a tool-releasing position; and a latch radially displaceable in the socket in the tool-releasing position of the socket between an inner retaining position projecting radially into the seat and an outer freeing position clear of the seat and projecting radially into the pocket, the latch being aligned radially with the pocket only in the tool-releasing position, the chuck body engaging the latch and forcing it into the inner retaining position except when the socket is in the tool-releasing position, whereby a polygonal-section shank of a tool formed with a radially outwardly open cutout can be fitted to the seat when the socket is in the tool-releasing position and is retained by engagement of the latch element in the cutout when the socket is not in the tool-releasing position; and a lock member radially displaceable in the chuck body between a locked position engaging the socket and preventing movement of the socket into the tool-releasing position and an unlocked position allowing movement of the socket into the releasing position.

2. The drill chuck defined in claim 1 wherein the latch is a ball, the socket being formed with a radially extending passage receiving the ball and open radially inward and outward, the passage being axially level with the pocket in the tool-releasing position.

3. The drill chuck defined in claim 1 wherein the pocket is formed as a radially inwardly open groove in an inner surface of the recess.

4. The drill chuck defined in claim 1 wherein the socket and chuck body are formed with axially interengaged polygonal formations inhibiting rotation of the socket in the chuck body.

5. The drill chuck defined in claim 4 wherein the formation of the socket is an axially rearwardly projecting polygonal-section extension.

6. The drill chuck defined in claim 1, further comprising a spring braced between the socket and the chuck body and urging the socket axially forward out of the tool-releasing position.

7. The drill chuck defined in claim 1 wherein the chuck body is formed with a passage extending in a plane perpendicular to the axis and open radially inward into the recess and radially outward, the lock member being a pin displaceable along the passage and having an outer end projecting from the chuck body at least in the locked position.

8. The drill chuck defined in claim 7, further comprising a spring braced between the chuck body and the pin and urging the pin into the locked position.

9. The drill chuck defined in claim 7 wherein the socket has an axially forwardly projecting ridge and the pin has an axially rearwardly open groove aligned with the ridge only in the unlocked position of the pin.

10. The drill chuck defined in claim 9 wherein the pin has a surface engageable with the socket and preventing same from moving into the tool-releasing position except in the unlocked position of the pin.

11. The drill chuck defined in claim 9 wherein the unlocked position is radially inward of the unlocked position.

12. The drill chuck defined in claim 7 wherein the socket is formed with a radially outwardly open groove and the pin is formed with a radially inwardly open cutout through which the socket extends with play only in the outer unlocked position, the cutout being offset at least partially from the groove in the locked position with the pin engaged in the groove.

13. The drill chuck defined in claim 1 wherein the guide passages are angularly spaced about the axis and open axially forward into the recess, the jaws having outer edges formed with teeth, the mechanism including an internally threaded ring axially fixed but rotatable on the body and meshing with the teeth of the jaws.

14. The drill chuck defined in claim 13 wherein the mechanism includes a sleeve surrounding the body and fixed to the ring, the lock member projecting radially outward through the sleeve.

* * * * *